United States Patent
Gilbeck et al.

(10) Patent No.: US 8,322,772 B1
(45) Date of Patent: Dec. 4, 2012

(54) CONVERTIBLE CARGO RACK

(75) Inventors: Jon C. Gilbeck, Grafton, WI (US);
Darren Deblack, Oconomowoc, WI (US); Daniel J. Knight, Nicholasville, KY (US); Larry D. Swanson, Horicon, WI (US); Kenneth John Piber, Oconomowoc, WI (US); Joseph Oliver, Lincoln, NE (US); Gregory Alan Camenisch, Raleigh, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/251,971

(22) Filed: Oct. 3, 2011

(51) Int. Cl.
*B60J 7/00* (2006.01)

(52) U.S. Cl. ................. 296/37.15; 296/37.16; 296/37.5; 296/69

(58) Field of Classification Search ............... 296/37.15, 296/37.16, 37.5, 65.16, 66, 69
See application file for complete search history.

(56) References Cited

U.S. PATENT DOCUMENTS

| | | | |
|---|---|---|---|
| 5,492,257 A * | 2/1996 | Demick | 224/275 |
| 6,237,981 B1 | 5/2001 | Selleck | |
| 6,637,819 B2 * | 10/2003 | Tame | 297/331 |
| 6,899,378 B2 | 5/2005 | Rhodes et al. | |
| 6,905,159 B1 | 6/2005 | Saito et al. | |
| 6,994,388 B2 | 2/2006 | Saito et al. | |
| 7,240,948 B1 | 7/2007 | Houston et al. | |
| 7,249,798 B2 | 7/2007 | Saito et al. | |
| 7,416,238 B2 | 8/2008 | Houston | |
| 7,478,861 B1 | 1/2009 | Kubota | |
| 7,578,544 B1 | 8/2009 | Shimamura et al. | |
| 7,581,780 B2 | 9/2009 | Shimamura et al. | |
| 7,673,920 B2 | 3/2010 | Nakamura et al. | |
| 7,841,639 B2 | 11/2010 | Tanaka et al. | |
| RE42,086 E | 2/2011 | Saito et al. | |
| 2009/0184531 A1 | 7/2009 | Yamamura et al. | |
| 2009/0184536 A1 | 7/2009 | Kubota | |
| 2010/0019539 A1 | 1/2010 | Nakamura et al. | |

* cited by examiner

*Primary Examiner* — Joseph Pape

(57) ABSTRACT

A convertible cargo rack has a platform attached to a rear seat back and pivots between a seating position and a cargo position. A side rail is linked to the platform and pivots together with the platform. The side rail provides a retaining structure above and around the perimeter of the platform in the cargo position, and is generally coplanar with the front, side and rear walls of the cargo box in the cargo position. Linkages between the platform and the side rail align the platform and the side rail so they are generally parallel to each other in any position.

15 Claims, 5 Drawing Sheets

US 8,322,772 B1

CONVERTIBLE CARGO RACK

FIELD OF THE INVENTION

This invention relates to utility vehicles for off road or recreational use, and more specifically to convertible cargo racks for utility vehicles.

BACKGROUND OF THE INVENTION

Utility vehicles for off-road and recreational use may have two rows of seats, with one row behind the other, for seating 4 to 6 passengers. A cargo box also may be provided behind the second or rear seat. Some utility vehicles have a rear seat and a cargo box that are fixed. However, when the second or rear seat is not used for carrying passengers, it is desirable to use that space for carrying cargo.

For that reason, some utility vehicles include a rear seat that is retractable and a cargo box that is expandable into the space formerly occupied by the rear seat. For example, U.S. Pat. Nos. 6,994,388; 7,578,544; 7,581,780; 7,841,639; and RE42,086 relate to pickup-style utility vehicles with conversion mechanisms to retract the rear seat and expand the cargo box into the rear seat area. These conversion mechanisms may require two persons and/or multiple steps to retract the rear seat and expand the cargo box, and are subject to wear over time that may slow or interfere with their use.

A convertible cargo rack for a utility vehicle is needed that can be converted from a rear seat to a cargo rack by one person with a minimal number of steps. A convertible cargo rack is needed for a utility vehicle that is simple and quick to operate, and has few mechanical components that are subject to wear that may restrict their use.

SUMMARY OF THE INVENTION

A convertible cargo rack including a rear seat having a seat back pivotably mounted to a utility vehicle frame, and a platform attached to the seat back and pivotable with the seat back between an upright position in a generally vertical plane and a down position in a generally horizontal plane. A side rail is pivotably mounted to the utility vehicle frame and pivots with the platform between an upright position generally parallel to the platform and a down position generally parallel to and above and around a perimeter of the platform. A pair of pivoting linkages connect the side rail to the platform. The convertible cargo rack may be converted from a rear seat to a cargo rack by one person with a minimal number of steps, is relatively easy to operate, and has few mechanical components that may be subject to wear.

DESCRIPTION OF THE PREFERRED EMBODIMENT

Figure 1:
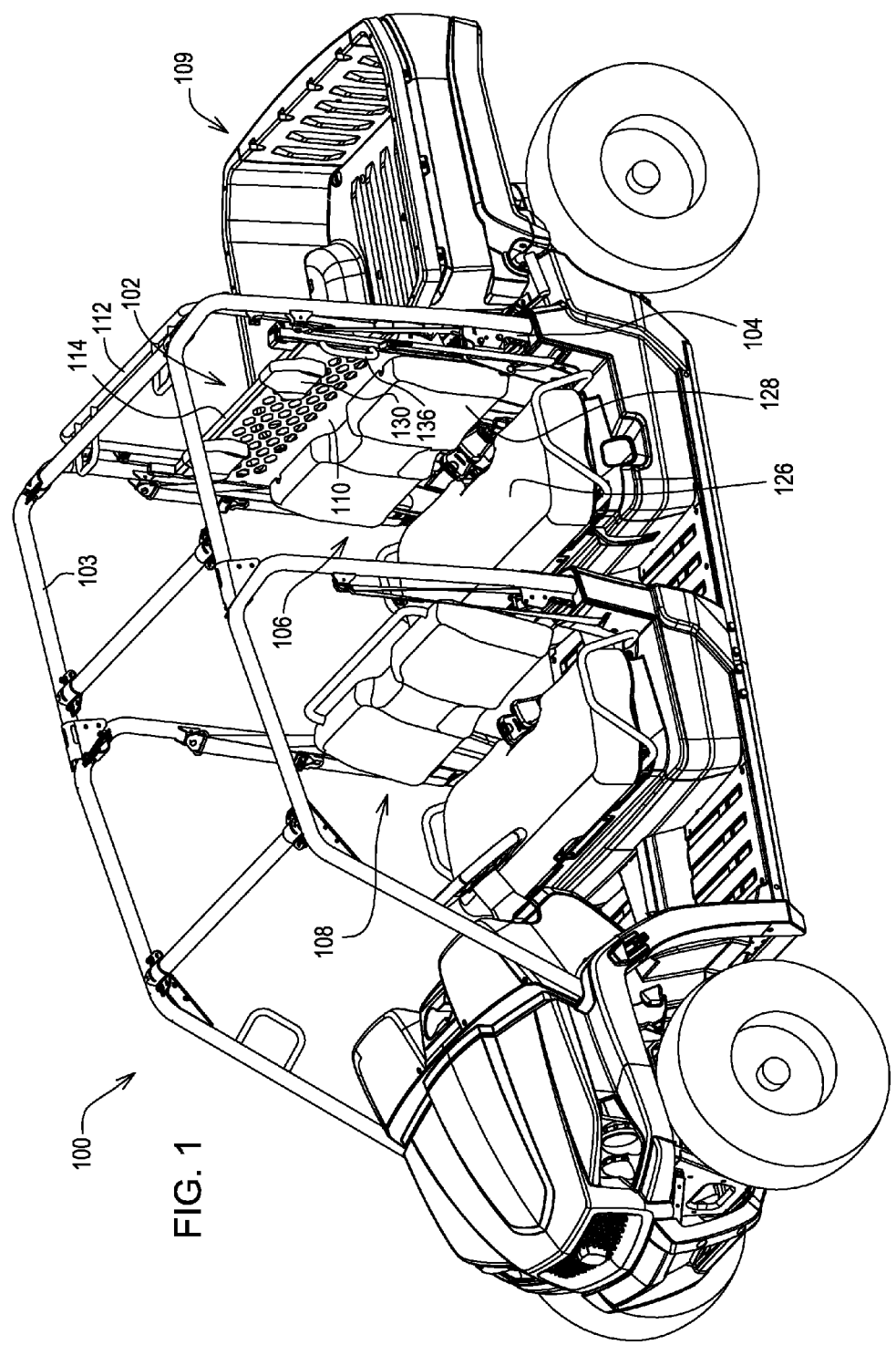
FIG. 1 is a side perspective view of a utility vehicle with a convertible cargo rack in an upright or seating position according to a preferred embodiment of the invention.
Figure 2:
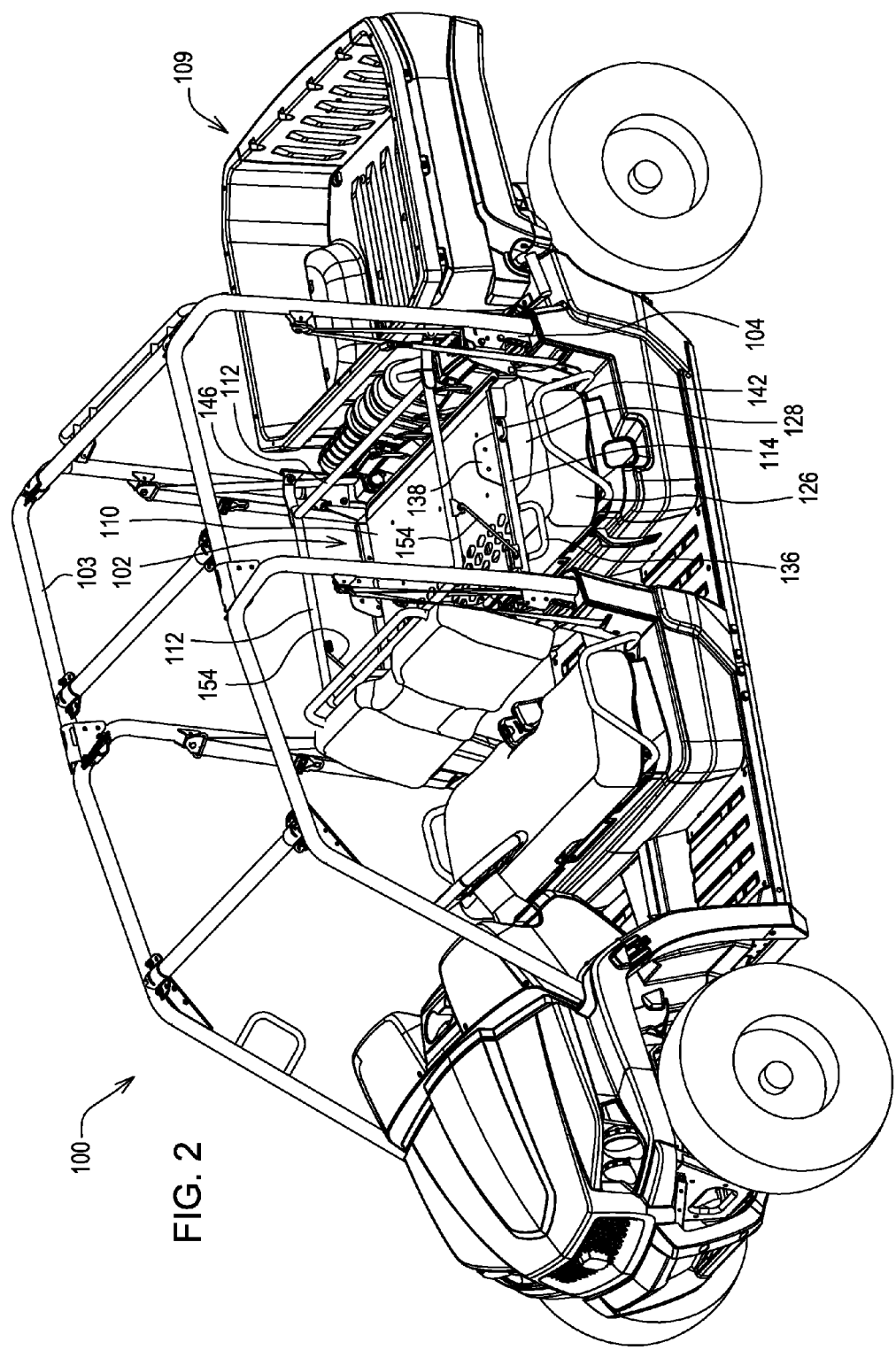
FIG. 2 is a side perspective view of a utility vehicle with a convertible cargo rack in a down or cargo position according to a preferred embodiment of the invention.

In FIG. 1, utility vehicle 100 is shown with convertible cargo rack 102 in the upright or seating position. In FIG. 2, utility vehicle 100 is shown with convertible cargo rack 102 in the down or cargo position. The convertible cargo rack may be pivotably mounted to a portion of utility vehicle frame 104 located adjacent and behind rear seat 106. The rear seat may be a bench seat or pair of seats located in a second row behind front seat 108, and the rear seat back 128 may be folded down to utilize the cargo rack. The utility vehicle also may include rollover protection system 103 mounted to the frame, and cargo box 109 mounted to the frame behind rear seat 106 and convertible cargo rack 102.

In one embodiment, convertible cargo rack 102 may include platform 110 and side rail 112. The platform may provide a floor or bottom surface of the convertible cargo rack, and the side rail may provide a retaining structure above the platform and around the perimeter of the platform, and preferably at least about six inches above the platform when the convertible cargo rack is in the down or cargo position of FIG. 2. The platform and side rail may be in generally parallel planes to each other in any position, and may be connected by at least one linkage 154 so that the platform and side rail may pivot together between the upright or seating position shown in FIG. 1 and the down or cargo position shown in FIG. 2. The linkages assure the platform and side rail are aligned vertically and generally parallel to each other in the upright or seating position, and are aligned horizontally and generally parallel to each other in the down or cargo position.

In one embodiment, platform 110 may include a generally rectangular frame 114 around its outer perimeter, with the sides of the frame connected together by front and rear portions of the frame. The frame around the platform preferably may be metal, plastic or other material having a rectangular cross section, and may be secured to the rear face of the platform, providing a lip or edge that projects up from the perimeter of platform to help retain items on the platform when the convertible cargo rack is in the down or cargo position. At least part of platform 110, and preferably an upper portion of the platform above the rear seat back or backs in the upright or seating position of FIG. 1, may be perforated or have a plurality of openings, or be formed from mesh or metal grate. At least part of the platform also may be sheet metal, plastic or other material.

Figure 3:
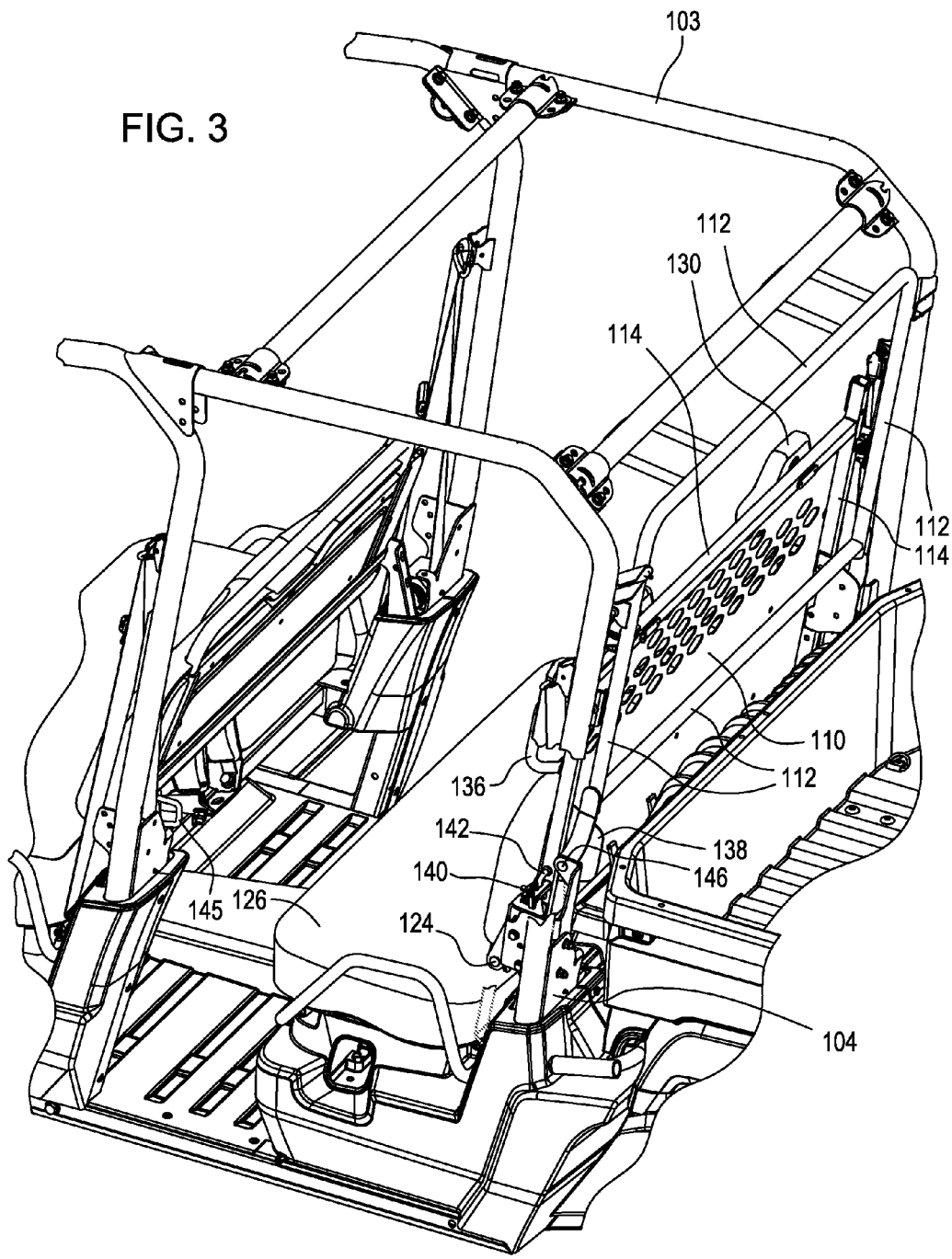
FIG. 3 is a side perspective view of a convertible cargo rack in the upright or seating position according to a preferred embodiment of the invention.
Figure 4:
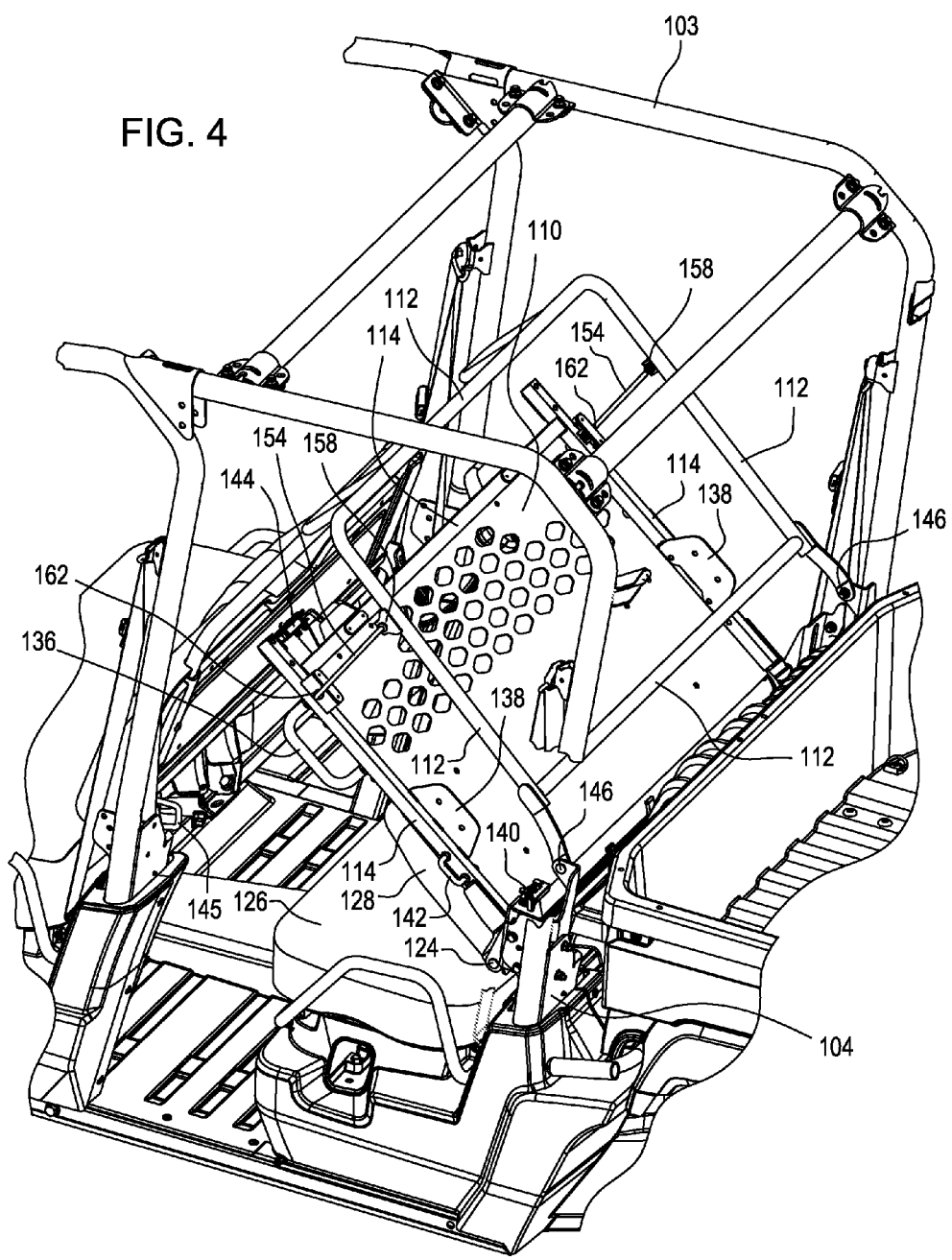
FIG. 4 is a side perspective view of a convertible cargo rack in an intermediate position between the upright and down positions according to a preferred embodiment of the invention.
Figure 5:
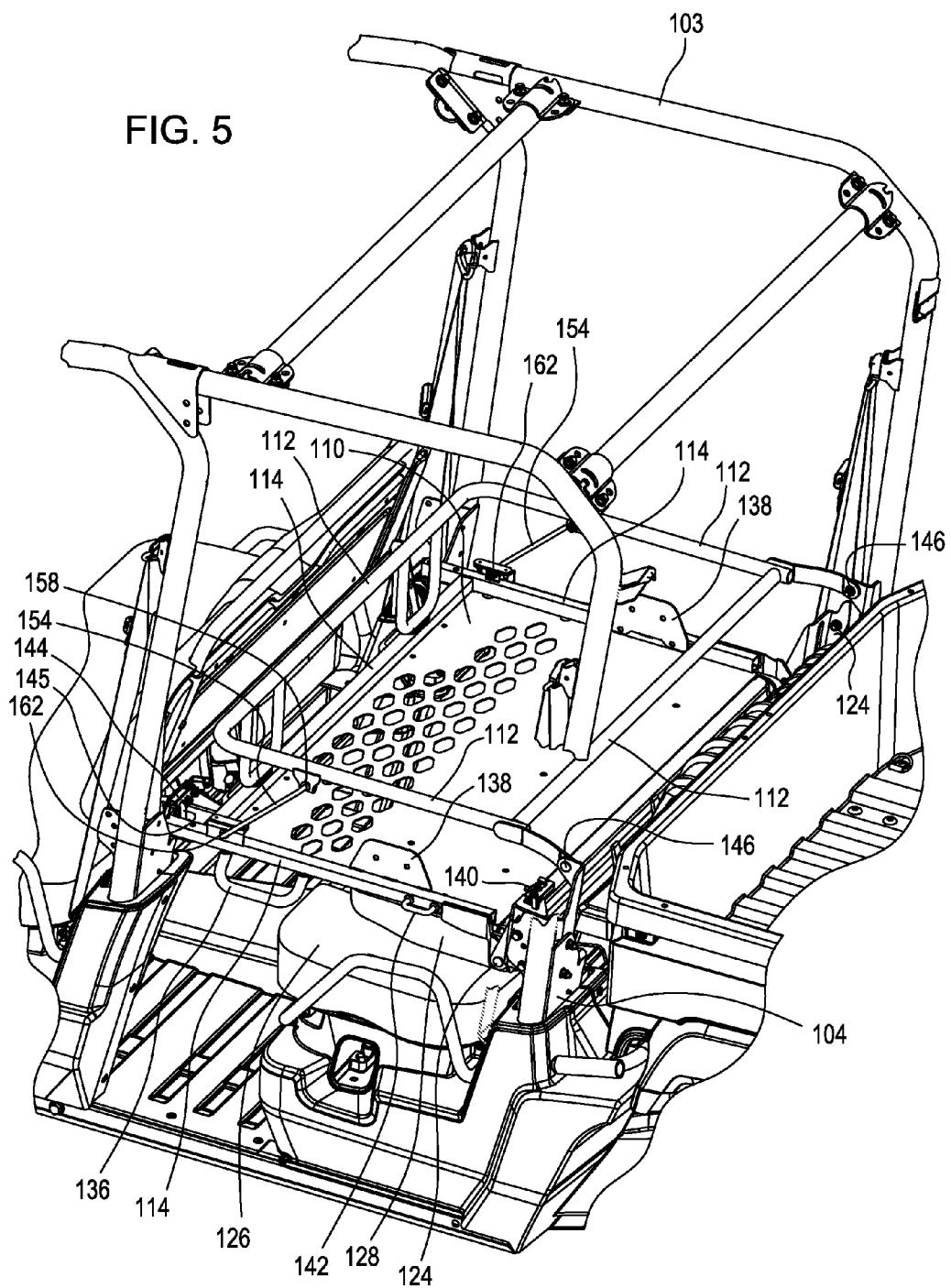
FIG. 5 is a side perspective view of a convertible cargo rack in the down or cargo position according to a preferred embodiment of the invention.

Now referring to FIGS. 3-5, in one embodiment, platform 110 may be pivotably mounted at a first pair of pivot points 124 to the utility vehicle frame adjacent or behind rear seat bottom 126. Rear seat back(s) 128 and head rests 130 may be attached to platform 110. In the down or cargo position of FIG. 5, rear seat back(s) 128 may fold over forwardly and may contact rear seat bottom(s) 126. Handles 136, 138 may be attached to the front and back of frame 114 respectively, and may be gripped by an operator to swing the convertible cargo rack between the upright or seating position and the down or cargo position. Handles 136, 138 also may provide side barriers to help retain items in the convertible cargo box.

In one embodiment, one person may easily and quickly convert the convertible cargo rack from the upright or seating position of FIG. 3 to the down or cargo position of FIG. 5. For example, the operator may disengage first latch 140 behind the rear seat from upper latch point 142 on the side of the platform, and swing the convertible cargo rack about ninety degrees from the upright or seating position to the down or cargo position where second latch 144 on the top of the platform may engage lower latch point 145 behind the front seat. Similarly, one person may easily and quickly convert the convertible cargo rack from the down or cargo position of FIG. 5 to the upright or seating position of FIG. 3 by releasing second latch 144 from lower latch point 145, and swinging the convertible cargo rack about ninety degrees from the down or cargo position to the upright or seating position, where first latch 140 engages upper latch point 142.

In one embodiment, side rail 112 may be pivotably mounted to utility vehicle frame 104 behind rear seat 106. The side rail may be pivotably mounted to the frame at a second pair of pivot points 146, which may be located above and rearwardly of first pivot points 124 for the platform. The side rail may include sides connected together by front and rear portions. The side rail preferably may be tubular metal or plastic, and accessories or retainers may be attached to the side rail using a quick clamp device without tools.

In one embodiment, side rail 112 may be connected by pivotable linkages 154 to platform 110. For example, linkages 154 may be U-shaped rods having first or upper ends pivotably connected to the side rail at pivot points 158, and second or lower ends pivotably connected to the platform at pivot points 162. Linkages 154, in combination with pivot points 124 and 146, form a four bar linkage so that side rail 112 may be generally parallel to platform 110 in the upright or seating position of FIG. 3, the down or cargo position of FIG. 5, or any intermediate position such as FIG. 4. In the down or cargo position, side rail 112 preferably may be at least about six inches above platform 110. In the upright or seating position, side rail 112 may be positioned less than about six inches behind platform 110, and the side rail also may extend vertically higher than the platform.

In one embodiment, convertible cargo rack 102 may provide a second cargo area located forwardly of cargo box 109. For example, the cargo volume of the convertible cargo rack may be about 5 cubic feet and the capacity may be about 200 lbs. When the convertible cargo rack is in the down or cargo position, the side rail may be coplanar with the top of the cargo box walls, so that the side rail is aligned horizontally with the top of the cargo box walls. Thus, the front, back and sides of the side rail, and the front, back and sides of the cargo box, define a perimeter having a generally flat or planar surface. Items that are longer than the cargo box or convertible cargo rack alone may be carried and supported on a plane on top of the side rail and cargo box walls.

Having described the preferred embodiment, it will become apparent that various modifications can be made without departing from the scope of the invention as defined in the accompanying claims.

We claim:

1. A convertible cargo rack, comprising:
  a rear seat having a seat back pivotably mounted to a utility vehicle frame at a first pair of pivot points;
  a platform attached to the seat back and pivotable with the seat back between an upright position in a generally vertical plane and a down position in a generally horizontal plane;
  a side rail pivotably mounted to the utility vehicle frame at a second pair of pivot points and pivoting together with the platform between an upright position generally parallel to the platform and a down position generally parallel to and above and around a perimeter of the platform; and
  a pair of pivoting linkages connecting the side rail to the platform.

2. The convertible cargo rack of claim 1 wherein the side rail is at least about six inches above the platform in the down position.

3. The convertible cargo rack of claim 1 wherein the second pair of pivot points are above and rearwardly of the first pair of pivot points.

4. The convertible cargo rack of claim 1 further comprising a cargo box behind the seat back and having front, back and sides in the same horizontal plane as the side rail in the down position.

5. The convertible cargo rack of claim 1 wherein the side rail has a tubular cross section.

6. A convertible cargo rack, comprising:
  a platform attached to a rear seat back pivoting between a seating position and a cargo position, the platform having a perimeter that is forward of a utility vehicle cargo box having front, side and rear walls in the seating position and the cargo position; and
  a side rail linked to the platform and pivoting together with the platform between the seating position and the cargo position, and providing a retaining structure above and around the perimeter of the platform in the cargo position, and being generally coplanar with the front, side and rear walls of the cargo box in the cargo position.

7. The convertible cargo rack of claim 6 further comprising a pair of linkages between the platform and the side rail, the linkages aligning the platform and the side rail generally parallel to each other in the seating position, the cargo position, and any intermediate position between the seating and the cargo positions.

8. The convertible cargo rack of claim 6 further comprising a frame around the perimeter of the platform.

9. The convertible cargo rack of claim 6 wherein at least a portion of the platform is perforated.

10. The convertible cargo rack of claim 6 further comprising a first latch holding the platform and the side rail in the seating position, and a second latch holding the platform and the side rail in the cargo position.

11. A convertible cargo rack, comprising:
  a rear seat pivotably mounted behind a front seat of a utility vehicle and pivotable between a seating position and a cargo position;
  a platform attached to the rear seat and pivoting with the rear seat to provide a generally horizontal floor over the rear seat in the cargo position; and
  a side rail pivotably mounted to the utility vehicle behind the rear seat and pivoting together with the platform to a generally horizontal position above the platform in the cargo position.

12. The convertible cargo rack of claim 11, wherein the side rail is tubular metal.

13. The convertible cargo rack of claim 11, wherein at least part of the platform has a plurality of openings.

14. The convertible cargo rack of claim 11, further comprising a plurality of linkages between the platform and the side rail, the linkages securing the platform and the side rail in parallel alignment to each other.

15. The convertible cargo rack of claim 11, further comprising a cargo box behind the platform and the side rail in the seating position and the cargo position; the cargo box having a front wall and side walls that are coplanar with the side rail in the cargo position.

* * * * *